US008891605B2

(12) United States Patent
Afkhami et al.

(10) Patent No.: US 8,891,605 B2
(45) Date of Patent: Nov. 18, 2014

(54) VARIABLE LINE CYCLE ADAPTATION FOR POWERLINE COMMUNICATIONS

(71) Applicant: QUALCOMM Incorporated, San Diego, CA (US)

(72) Inventors: Hassan Kaywan Afkhami, Ocala, FL (US); Purva Rameshchandra Rajkotia, Orlando, FL (US); Lawrence Winston Yonge, III, Summerfield, FL (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/800,039

(22) Filed: Mar. 13, 2013

(65) Prior Publication Data

US 2014/0269874 A1    Sep. 18, 2014

(51) Int. Cl.
*H04B 3/46* (2006.01)
*H04B 3/04* (2006.01)
*H04B 3/54* (2006.01)

(52) U.S. Cl.
CPC ... *H04B 3/04* (2013.01); *H04B 3/54* (2013.01)
USPC ......................................................... 375/227

(58) Field of Classification Search
CPC ........... H04B 3/542; H04B 2203/5495; H04L 5/0044
USPC ......................................................... 375/227
See application file for complete search history.

(56) References Cited

U.S. PATENT DOCUMENTS

| | | | |
|---|---|---|---|
| 3,806,885 A | 4/1974 | Moore | |
| 4,032,884 A | 6/1977 | Gutleber | |
| 4,569,044 A | 2/1986 | Tao et al. | |
| 4,581,734 A | 4/1986 | Olson et al. | |
| 4,630,261 A | 12/1986 | Irvin | |
| 4,677,612 A | 6/1987 | Olson et al. | |
| 4,682,324 A | 7/1987 | Ulug | |
| 4,720,850 A | 1/1988 | Oberlander et al. | |
| 4,726,018 A | 2/1988 | Bux et al. | |
| 4,792,947 A | 12/1988 | Takiyasu et al. | |
| 4,819,229 A | 4/1989 | Pritty et al. | |
| 4,881,241 A | 11/1989 | Pommier et al. | |

(Continued)

FOREIGN PATENT DOCUMENTS

DE    3413144 A1    10/1985
JP    63036622 A    2/1988

(Continued)

OTHER PUBLICATIONS

Applied Cryptography, Second Edition, protocols, algorithms and source code in C, Bruce Schneier, 1996, pp. 196-197.

(Continued)

*Primary Examiner* — Juan A Torres
(74) *Attorney, Agent, or Firm* — DeLizio Gilliam, PLLC

(57) ABSTRACT

Line cycle adaptation periods may have variable duration. A powerline cycle may be segmented into a plurality of line cycle adaptation periods having variable duration based upon signal-to-noise (SNR) characteristics measured at various times throughout the powerline cycle. The line cycle adaptation periods may include at least two periods with unequal durations. Each line cycle adaptation period may be associated with one or more tone maps defining physical layer transmission properties to be used by a second device for transmissions occurring during the line cycle adaptation period.

23 Claims, 8 Drawing Sheets

(56) References Cited

U.S. PATENT DOCUMENTS

| | | |
|---|---|---|
| 4,943,959 A | 7/1990 | Arnold |
| 5,001,472 A | 3/1991 | Fischer et al. |
| 5,003,539 A | 3/1991 | Takemoto et al. |
| 5,046,069 A | 9/1991 | Calvignac et al. |
| 5,081,678 A | 1/1992 | Kaufman et al. |
| 5,105,423 A | 4/1992 | Tanaka et al. |
| 5,121,396 A | 6/1992 | Irvin et al. |
| 5,140,584 A | 8/1992 | Suzuki |
| 5,157,659 A | 10/1992 | Schenkel |
| 5,197,061 A | 3/1993 | Halbert-Lassalle et al. |
| 5,214,646 A | 5/1993 | Yacoby |
| 5,228,025 A | 7/1993 | Le Floch et al. |
| 5,231,634 A | 7/1993 | Giles et al. |
| 5,274,629 A | 12/1993 | Helard et al. |
| 5,280,480 A | 1/1994 | Pitt et al. |
| 5,307,376 A | 4/1994 | Castelain et al. |
| 5,339,313 A | 8/1994 | Ben-Michael et al. |
| 5,343,473 A | 8/1994 | Cidon et al. |
| 5,384,777 A | 1/1995 | Ahmadi et al. |
| 5,416,801 A | 5/1995 | Chouly et al. |
| 5,426,646 A | 6/1995 | Slack |
| RE35,001 E | 7/1995 | Grow |
| 5,432,848 A | 7/1995 | Butter et al. |
| 5,436,905 A | 7/1995 | Li et al. |
| 5,448,565 A | 9/1995 | Chang et al. |
| 5,452,288 A | 9/1995 | Rahuel et al. |
| 5,452,322 A | 9/1995 | Lauer |
| 5,473,602 A | 12/1995 | McKenna et al. |
| 5,481,535 A | 1/1996 | Hershey |
| 5,483,529 A | 1/1996 | Baggen et al. |
| 5,488,632 A | 1/1996 | Mason et al. |
| 5,504,747 A | 4/1996 | Sweazey |
| 5,515,379 A | 5/1996 | Crisler et al. |
| 5,524,027 A | 6/1996 | Huisken |
| 5,537,414 A | 7/1996 | Takiyasu et al. |
| 5,541,922 A | 7/1996 | Pyhalammi |
| 5,548,649 A | 8/1996 | Jacobson |
| 5,555,268 A | 9/1996 | Fattouche et al. |
| 5,563,883 A | 10/1996 | Cheng |
| 5,563,897 A | 10/1996 | Pyndiah et al. |
| 5,568,476 A | 10/1996 | Sherer et al. |
| 5,610,908 A | 3/1997 | Shelswell et al. |
| 5,612,975 A | 3/1997 | Becker et al. |
| 5,615,212 A | 3/1997 | Ruszczyk et al. |
| 5,619,651 A | 4/1997 | Young |
| 5,623,512 A | 4/1997 | Sasaki |
| 5,629,948 A | 5/1997 | Hagiwara et al. |
| 5,636,230 A | 6/1997 | Marturano et al. |
| 5,644,576 A | 7/1997 | Bauchot et al. |
| 5,651,009 A | 7/1997 | Perreault et al. |
| 5,694,389 A | 12/1997 | Seki et al. |
| 5,706,348 A | 1/1998 | Gray et al. |
| 5,717,689 A | 2/1998 | Ayanoglu |
| 5,732,113 A | 3/1998 | Schmidl et al. |
| 5,737,330 A | 4/1998 | Fulthorp et al. |
| 5,745,769 A | 4/1998 | Choi |
| 5,757,766 A | 5/1998 | Sugita |
| 5,757,770 A | 5/1998 | Lagoutte et al. |
| 5,764,931 A | 6/1998 | Schmahl et al. |
| 5,771,235 A | 6/1998 | Tang et al. |
| 5,787,071 A | 7/1998 | Basso et al. |
| 5,790,541 A | 8/1998 | Patrick et al. |
| 5,793,307 A | 8/1998 | Perreault et al. |
| 5,799,033 A | 8/1998 | Baggen |
| 5,812,599 A | 9/1998 | Van Kerckhove |
| 5,818,821 A | 10/1998 | Schurig |
| 5,818,826 A | 10/1998 | Gfeller et al. |
| 5,825,807 A | 10/1998 | Kumar |
| 5,828,293 A | 10/1998 | Rickard |
| 5,828,677 A | 10/1998 | Sayeed et al. |
| 5,841,778 A | 11/1998 | Shaffer et al. |
| 5,841,873 A | 11/1998 | Lockhart et al. |
| 5,884,040 A | 3/1999 | Chung |
| 5,886,993 A | 3/1999 | Ruszczyk et al. |
| 5,892,769 A | 4/1999 | Lee |
| 5,896,561 A | 4/1999 | Schrader et al. |
| 5,903,614 A | 5/1999 | Suzuki et al. |
| 5,914,932 A | 6/1999 | Suzuki et al. |
| 5,914,959 A | 6/1999 | Marchetto et al. |
| 5,940,399 A | 8/1999 | Weizman |
| 5,940,438 A | 8/1999 | Poon et al. |
| 5,948,060 A | 9/1999 | Gregg et al. |
| 5,956,338 A | 9/1999 | Ghaibeh |
| 5,966,412 A | 10/1999 | Ramaswamy |
| 5,970,062 A | 10/1999 | Bauchot |
| 5,987,011 A | 11/1999 | Toh |
| 6,005,894 A | 12/1999 | Kumar |
| 6,006,017 A | 12/1999 | Joshi et al. |
| 6,041,063 A | 3/2000 | Povlsen et al. |
| 6,041,358 A | 3/2000 | Huang et al. |
| 6,044,154 A | 3/2000 | Kelly |
| 6,044,482 A | 3/2000 | Wong |
| 6,052,377 A | 4/2000 | Ohmi et al. |
| 6,076,115 A | 6/2000 | Sambamurthy et al. |
| 6,092,214 A | 7/2000 | Quoc et al. |
| 6,097,703 A | 8/2000 | Larsen et al. |
| 6,098,179 A | 8/2000 | Harter, Jr. |
| 6,108,713 A | 8/2000 | Sambamurthy et al. |
| 6,115,429 A | 9/2000 | Huang |
| 6,125,150 A | 9/2000 | Wesel et al. |
| 6,130,887 A | 10/2000 | Dutta |
| 6,130,894 A | 10/2000 | Ojard et al. |
| 6,151,296 A | 11/2000 | Vijayan et al. |
| 6,169,744 B1 | 1/2001 | Grabelsky et al. |
| 6,182,147 B1 | 1/2001 | Farinacci |
| 6,188,717 B1 | 2/2001 | Kaiser et al. |
| 6,192,397 B1 | 2/2001 | Thompson |
| 6,202,082 B1 | 3/2001 | Tomizawa et al. |
| 6,215,792 B1 | 4/2001 | Abi-Nassif |
| 6,216,244 B1 | 4/2001 | Myers et al. |
| 6,222,851 B1 | 4/2001 | Petry |
| 6,243,386 B1 | 6/2001 | Chan et al. |
| 6,243,449 B1 | 6/2001 | Margulis et al. |
| 6,246,770 B1 | 6/2001 | Stratton et al. |
| 6,252,849 B1 | 6/2001 | Rom et al. |
| 6,259,696 B1 | 7/2001 | Yazaki et al. |
| 6,263,445 B1 | 7/2001 | Blumenau |
| 6,278,685 B1 | 8/2001 | Yonge, III et al. |
| 6,278,716 B1 | 8/2001 | Rubenstein et al. |
| 6,279,716 B1 | 8/2001 | Kayatani et al. |
| 6,289,000 B1 | 9/2001 | Yonge, III |
| 6,295,296 B1 | 9/2001 | Tappan |
| 6,334,185 B1 | 12/2001 | Hansson et al. |
| 6,343,083 B1 | 1/2002 | Mendelson et al. |
| 6,363,052 B1 | 3/2002 | Hosein |
| 6,370,156 B2 | 4/2002 | Spruyt et al. |
| 6,385,672 B1 | 5/2002 | Wang et al. |
| 6,393,051 B1 | 5/2002 | Koizumi et al. |
| 6,397,368 B1 | 5/2002 | Yonge, III et al. |
| 6,421,725 B1 | 7/2002 | Vermilyea et al. |
| 6,430,192 B1 | 8/2002 | Creedon et al. |
| 6,430,661 B1 | 8/2002 | Larson et al. |
| 6,434,153 B1 | 8/2002 | Yazaki et al. |
| 6,442,129 B1 | 8/2002 | Yonge, III et al. |
| 6,456,649 B1 | 9/2002 | Isaksson et al. |
| 6,466,580 B1 | 10/2002 | Leung |
| 6,469,992 B1 | 10/2002 | Schieder |
| 6,473,435 B1 | 10/2002 | Zhou et al. |
| 6,480,489 B1 | 11/2002 | Muller et al. |
| 6,487,212 B1 | 11/2002 | Erimli et al. |
| 6,501,760 B1 | 12/2002 | Ohba et al. |
| 6,519,263 B1 | 2/2003 | Huth |
| 6,526,451 B2 | 2/2003 | Kasper |
| 6,538,985 B1 | 3/2003 | Petry et al. |
| 6,553,534 B2 | 4/2003 | Yonge, III et al. |
| 6,567,914 B1 | 5/2003 | Just et al. |
| 6,654,410 B2 | 11/2003 | Tzannes |
| 6,667,991 B1 | 12/2003 | Tzannes |
| 6,671,284 B1 | 12/2003 | Yonge, III et al. |
| 6,747,976 B1 | 6/2004 | Bensaou et al. |
| 6,778,507 B1 | 8/2004 | Jalali |
| 6,985,534 B1 | 1/2006 | Meister |
| 7,006,445 B1 * | 2/2006 | Cole et al. ............ 370/247 |
| 7,167,449 B2 | 1/2007 | Ikeda et al. |

(56) References Cited

U.S. PATENT DOCUMENTS

| | | | |
|---|---|---|---|
| 7,298,691 | B1 | 11/2007 | Yonge, III et al. |
| 7,369,579 | B2 | 5/2008 | Logvinov et al. |
| 7,684,502 | B2 | 3/2010 | Kurobe et al. |
| 7,715,425 | B2 | 5/2010 | Yonge, III et al. |
| 8,121,202 | B2 | 2/2012 | Koga et al. |
| 2001/0012319 | A1 | 8/2001 | Foley |
| 2001/0043576 | A1 | 11/2001 | Terry |
| 2001/0048692 | A1 | 12/2001 | Karner |
| 2002/0012320 | A1 | 1/2002 | Ogler et al. |
| 2002/0042836 | A1 | 4/2002 | Mallory |
| 2002/0048368 | A1 | 4/2002 | Gardner |
| 2002/0065047 | A1 | 5/2002 | Moose |
| 2002/0191533 | A1 | 12/2002 | Chini et al. |
| 2003/0006883 | A1 | 1/2003 | Kim et al. |
| 2003/0079169 | A1 | 4/2003 | Ho et al. |
| 2003/0174664 | A1 | 9/2003 | Benveniste |
| 2003/0217182 | A1 | 11/2003 | Liu et al. |
| 2004/0001499 | A1 | 1/2004 | Patella et al. |
| 2004/0036478 | A1* | 2/2004 | Logvinov et al. ............. 324/534 |
| 2004/0070912 | A1 | 4/2004 | Kopp |
| 2005/0114904 | A1 | 5/2005 | Monk et al. |
| 2005/0190785 | A1* | 9/2005 | Yonge et al. ................... 370/465 |
| 2007/0025391 | A1* | 2/2007 | Yonge et al. ................... 370/458 |
| 2007/0109971 | A1* | 5/2007 | Yoshida et al. ................ 370/236 |
| 2009/0072985 | A1* | 3/2009 | Patel et al. .................... 340/657 |
| 2009/0154487 | A1* | 6/2009 | Ryan et al. ..................... 370/445 |
| 2010/0073149 | A1 | 3/2010 | Goldfisher et al. |
| 2011/0267956 | A1* | 11/2011 | Yonge al. ....................... 370/241 |
| 2011/0280329 | A1* | 11/2011 | Yonge et al. ................... 375/267 |
| 2012/0093240 | A1* | 4/2012 | McFarland et al. ........... 375/257 |
| 2012/0257683 | A1 | 10/2012 | Schwager et al. |

FOREIGN PATENT DOCUMENTS

| | | |
|---|---|---|
| JP | 6164608 A | 6/1994 |
| JP | 2001230708 A | 8/2001 |
| JP | 2002172332 A | 6/2002 |
| JP | 2003101557 A | 4/2003 |
| JP | 2003338778 A | 11/2003 |
| WO | 9840970 A1 | 9/1998 |
| WO | 9857439 A1 | 12/1998 |
| WO | 9857440 A2 | 12/1998 |
| WO | 0072495 A2 | 11/2000 |
| WO | 0241598 A2 | 5/2002 |
| WO | 0251089 A2 | 6/2002 |

OTHER PUBLICATIONS

Benedetto S., et al., "A Soft-input soft-ouput Maximum A Posteriori (MAP) Module to Decode Parallel and Serial Concatenated Codes," TDA Progress Report, 1996, vol. 42 (127), pp. 1-20, (XP002959296).
Bertsekas, et al., Data Networks, Prentice Hall, Englewood Cliffs, NJ, Section 2.4.3 Selective Repeat ARQ, 1992, pp. 64-87.
Blake, et al., "An Architecture for Differentiated Services," The Internet Society, 1998, RFC 2475, pp. 1-31.
Broadband Radio Access Networks (BRAN); High Performance Radio Local Area Network (HiperLAN), Type 1: Functional Specification, European Standard (Telecommunication Series) No. 300652 V. 1.2.1 (Jul. 1998), pp. 1-105.
Bruschi D., et al., "Secure Multicast in Wireless Networks of Mobile Hosts: Protocols and Issues," Mobile Networks and Applications, 2002, pp. 503-511.
Bux W., "Token-Ring Local-Area Networks and Their Performance," Proceedings of the IEEE, 1989, vol. 77 (2), pp. 238-256.
Carrier sense multiple access with collision detection (CSMA/CD) access method and physical layer specifications, International Standard (ANSI/IEEE Std 802.3), 2002, ISO/IEC 8802-3, pp. III-XXIII.
Carrier sense multiple access with collision detection (CSMA/CD) access method and physical layer specifications, International Standard, 1996, ISO/IEC 8802, Part 3, (ANSI/IEEE Std 802.3), pp. 1-44, 159,162,235-236,257-258.
Dichmann G., et al., "Digital Signal Processing for Multi-Carrier Data Transmission on Phase-Controlled Power Lines with Nonlinearities," IEEE International Symposium on Circuits and Systems (ISCAS), 1995, pp. 889-892, (XP000558825).
Dodds, et al., "Power Line Data Communication Using Timed Transmission," Proceedings of IEEE Canadian Conference of Electrical and Computer Engineering, 1994, vol. 1, pp. 280-283.
Dube P, et al., "Queueing analysis of early message discard policy," IEEE International Conference, 2002, vol. 4, pp. 2426-2430.
Ehrsam, et al., "A cryptographic key management scheme for implementing the Data Encryption Standard," IBM Systems Journal, 1978, vol. 17 (2), pp. 106-125.
Goalic, et al., "Real-Time Turbo-Decoding of Product Codes on a Digital Signal Processor," IEEE, 1997, pp. 624-628.
HomePlug Powerline Alliance, HomePlug 1.0.1 Specification, Dec. 1, 2001, pp. 1-139.
IBM, Combined use of collision resolution and collision avoidance MAC protocols, IBM Technical Disclosure Bulletin, 1994, vol. 37, pp. 299-302, (NN9410299).
Interface Specification for HomePNA.TM. 2.0 10M8 Technology—Link Layer Protocols, Dec. 1, 1999, pp. 1-77.
Kamerman A., et al., "Net throughput with IEEE 802.11 wireless LANs; Wireless Communications and Networking Conference," WCNC 2000 IEEE, 2000, vol. 2 (23-28), pp. 747-752.
Lee, et al., "HomePlug 1.0 powerline communication LANs—protocol description and performance results," International Journal of Communication Systems, 2003, vol. 16.
Niwa H., et al., "A Spread-Spectrum System with Dual Processing Gains Designed for Cyclic Noise in Power Line Communications," IEICE TRANSACTIONS on Fundamentals, 1997, vol. E80-A (12), pp. 2526-2533.
Peterson W., et al., "Error-Correcting Codes," Second Edition, The Massachusetts Institute of Technology Press, 1986, pp. 212-213, 261-263, 362.
PKCS #5 v. 20: Password-Based Cryptography Standard RSA Laboratories, Mar. 25, 1999.
Pyndiah R., et al., "Near Optimum Decoding of Product Codes," IEEE, 1994, pp. 339-343.
Pyndiah R., et al., "Near-Optimum Decoding of Product Codes: Block Turbo Codes," Ieee Transactions on Communications, IEEE Service Center, Piscataway, 1998, vol. 46 (8), pp. 1003-1010.
Pyndiah R., et al., "Performance of Block Turbo Coded 16-QAM and 64-QAM Modulations," IEEE, 1995, pp. 1039-1043.
Shared Wireless Access Protocol (Cordless Access) Specification, SWAP-CA Revision 1.21, Jan. 27, 1999, by the HomeRFTm Technical Committee, pp. 1-36, 368-372.
Sugimoto, et al., "Performance of an OFDM Communication System under a Frequency and Time Dependent Power-Line Channel", presented at ISPLC2001 on Apr. 4-6, 2001, downloaded from URL<:__ x00D__http://isplc2003.katayama.nuee.nagoya-u.ac.jp/plc-symposia/Malmo-2001.htm-1.>.
Sun, et al., "Public-key ID-based Cryptosystem," IEEE, 1991, pp. 142-144.
U.S. Appl. No. 09/632,303, filed Aug. 4, 2000, Yonge, III.
Wireless LAN Medium Access Control (MAC) and Physical Layer (PHY) specifications, International Standard (ANSI/IEEE Std802. 11), 1999, ISO/IEC 8802-11, pp. 1-98.
X-10 Communications Protocol and Power Line Interface, Jun. 2003, by SEcurity & Automation for the Professional, pp. 1-10.
Latchman-Newman, "HomePlug Standards for Worldwide Multimedia In-Home Networking and BPL Access", http://www.ieee-ispic.org/2007/docs/keynotes/latchman-newman, obtained from the Internet Jul. 8, 2014, 2007, 76 pages.

* cited by examiner

VARIABLE LINE CYCLE ADAPTATION FOR POWERLINE COMMUNICATIONS

BACKGROUND

Embodiments of the inventive subject matter generally relate to the field of powerline communications, and, more particularly, to variable line cycle adaptation.

Electric transmission and distribution lines are typically used for providing electric power from generators to buildings, residences, and other infrastructure. Electric power is transmitted over the transmission lines at a high voltage, and distributed to buildings and other structures at much lower voltages using electric powerlines. Besides providing electric power, electric powerlines can also be used to implement powerline communications within buildings and other structures. Powerline communications provide a means for networking electronic devices together and for connecting the electronic devices to the Internet. For example, HomePlug® devices can be used for wired broadband networking using IEEE P1901 standards for broadband over powerline communication. However, the powerline may be susceptible to periodic noise. For example, a dimmer switch may cause a periodic power spike or drain (or other noisy condition) on the powerline. Communication on the electrical wiring is also subject to variations in the channel characteristics and variations in the noise level that are common on the electrical wiring in a building, such as a home.

Communication technology is evolving to support better channel estimation and adaptation of transmissions over a communication channel. For example, in many technologies, such as powerline communications, a medium between a first device and a second device may support periodic channel adaption based on channel conditions. Indicators that may be used as a measurement of the quality of a transmission via a signal (e.g. via a frequency) include the signal-to-noise ratio (SNR) or signal-to-interference-plus-noise (SINR). The formula for SINR may be defined as $P/(I+N)$ where P represents the received power, I represents the interference power of other simultaneous transmissions, and N represents the noise (such as background or intermittent noise). Often, "noise" will be defined to include interference as well as background noise or intermittent noise. Therefore, when measuring signal to noise ratio, the measurement may be referred to as SNR or SINR interchangeably in some systems.

SUMMARY

Various embodiments are disclosed for variable line cycle adaptation periods. The line cycle adaptation periods may be defined based upon SNR characteristics measured at various times throughout the powerline cycle. A powerline cycle may be segmented into a plurality of line cycle adaptation periods having variable duration based upon the SNR characteristics. Each line cycle adaptation period may be associated with one or more tone maps defining physical layer transmission properties to be used by a transmitting device for transmissions occurring during the line cycle adaptation period.

In one embodiment, line cycle adaptation periods within the powerline cycle may be determined at a receiving device based upon the SNR characteristics. The line cycle adaptation periods may include at least two periods with unequal durations. The line cycle adaptation periods may be coordinated with a transmitting device such that subsequent transmissions from the transmitting device are in accordance with line cycle adaptation properties specific to each line cycle adaptation period.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
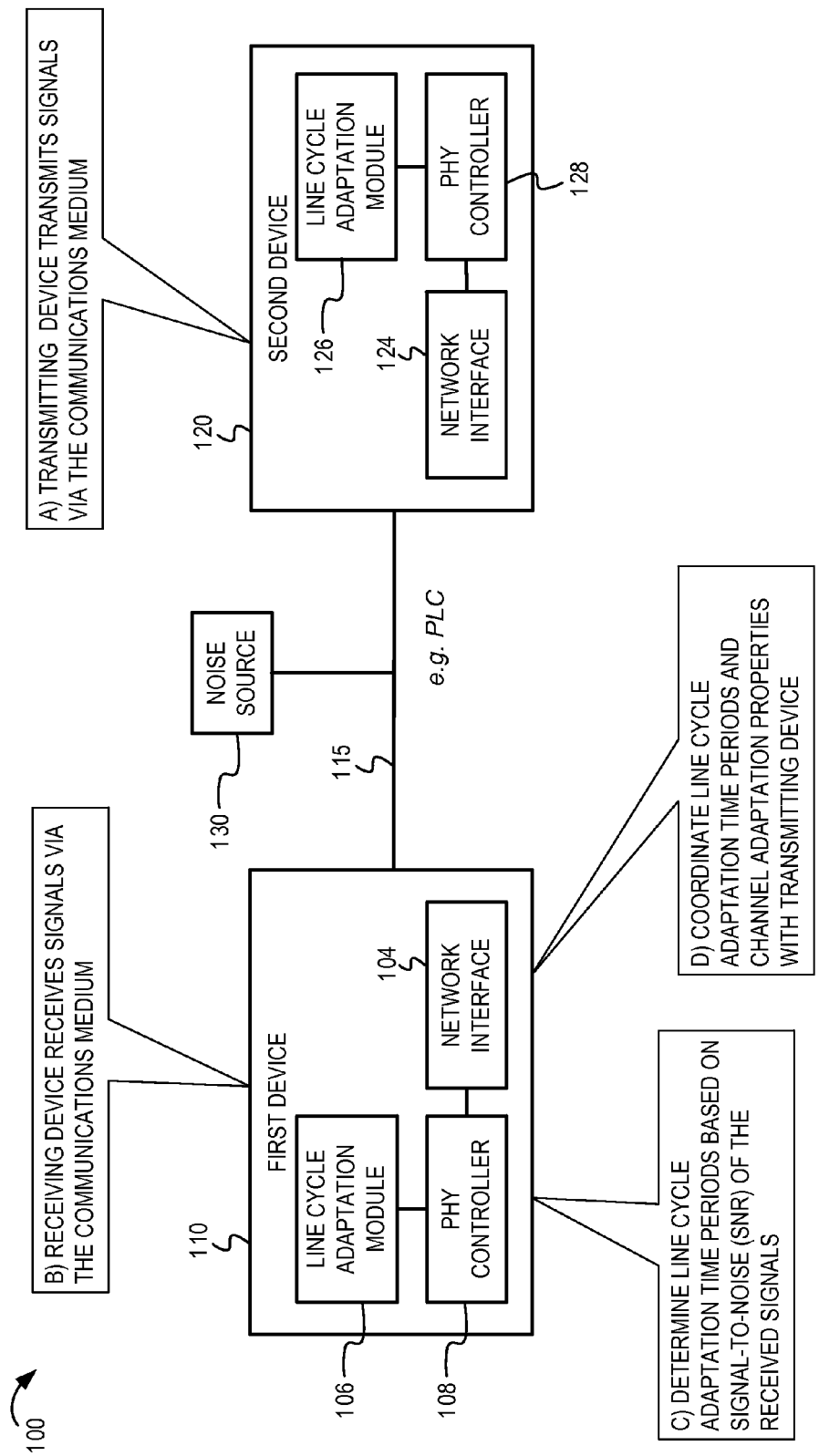
FIG. 1 is an example system diagram illustrating a communications network used to introduce various example embodiments of this disclosure.

The description that follows includes exemplary systems, methods, techniques, instruction sequences and computer program products that embody techniques of the present inventive subject matter. However, it is understood that the described embodiments may be practiced without these specific details. In other instances, well-known instruction instances, protocols, structures and techniques have not been shown in detail in order not to obfuscate the description.

Powerline communication (PLC) modems can enable powerline communication via a powerline network. PLC modems are typically included within a PLC adapter module that is a self-contained unit comprising an integrated power supply, zero cross detector (e.g., for lining up PLC transmissions relative to the alternating current (AC) line cycle frequency), the PLC modem, and other signal processing components. Powerline communications uses a powerline infrastructure medium between a first device and a second device to carry multi-frequency transmissions. Typically a channel estimation process is used to determine the quality associated with each carrier (i.e., frequency) over the communications medium. Upon completion of channel estimation processes, a device generates a tone map (which may also be referred to as "channel adaptation information"). The tone map includes transmission properties (e.g., modulation, coding rate, error correction, etc.) for one or more carriers used over the communications medium.

The powerline may be susceptible to periodic noise. For example, a dimmer switch may cause a periodic power spike or drain (or other noisy condition) on the powerline. Communication on the electrical wiring is subject to variations in the channel characteristics and variations in the noise level that are common on the electrical wiring. Channel attenuation characteristics vary when there are devices plugged into the electrical wiring that change the impedance presented to the line in a time varying fashion. Noise characteristics also change when certain devices emit noise due to switching on/off electrical circuitry. For example, a dimmer switch may cause a periodic power spike or drain (or other noisy condition) on the powerline. Many of these variations happen synchronously with the phase of the AV line cycle (for example, the 60 Hz cycle in the United States). For example, a zero crossing or cycle peak may cause a power change at the dimmer switch. Therefore, it is possible that a very short and periodic noise may be introduced onto the powerline. To accommodate for a noisy condition, a tone map for a time period during which the noise is present may utilize a conservative physical transmission rate. However, the noise may only be present for a fraction of the time period. In this disclosure, powerline modems may compensate for such changing channel and noise characteristics and utilize different signaling schemes based on the exact position of the transmission relative to the phase of the AC cycle.

In accordance with this disclosure, the powerline cycle may be segmented into variable size time periods each associated with a different tone map. The periods of the line cycle may be determined based on signal-to-noise (SNR) or other characteristics measured at various times throughout the powerline cycle. A powerline cycle may be segmented into a plurality of line cycle adaptation periods having variable duration based upon the SNR characteristics. Because the line cycle adaptation periods are dynamically generated based upon SNR characteristics, the line cycle adaptation periods may include at least two periods with unequal durations. Ideally, the line cycle adaptation periods are defined at a receiving device and then coordinated with a transmitting device so that both devices are configured with the same line cycle adaptation periods. This disclosure includes several ways in which the line cycle adaptation periods may be defined and in which they may be coordinated.

FIG. 1 depicts an example system 100 which will be described to introduce various aspects of the present disclosure. The system includes a first device 110 and a second device 120 communicatively coupled via a powerline communications medium 115. The first device and second device may also be referred to as nodes or stations. In the example system 100, powerline communications medium 115 may include a powerline communications (PLC) network shared by the first device 110, the second device 120, and a third device referred to as a noise source 130. The noise source 130 may or may not be a communications device. For example, as described below, several electrical components, such as switches, dimmers, appliances, etc. may introduce periodic noise onto the powerline communications medium 115.

In some implementations, the powerline communications medium 115 may be a Broadband Powerline Network (BPLN) that provides access to a backhaul network. A BPLN can be managed by a service provider entity having access to the underlying physical powerline medium. A BPLN is a general purpose network that can be used for several types of applications including, smart grid management, broadband internet access, voice and video delivery services, etc. In various implementations, a BPLN can be deployed on low voltage, medium voltage and high voltage powerlines. Additionally, a BPLN can span an entire neighborhood or it may be deployed within a single multi-dwelling unit. For example, it can be used to provide network service to tenants in a single apartment building. While powerlines are one medium for deploying the BPLN, similar techniques can be deployed on other wire lines, such as, for example, coaxial cables, twisted pair or a combination thereof.

In some implementations, the first and second devices 110, 120 may be nodes of a home network (HN) communicating with each other using a home networking technology. The first and second devices 110, 120 may communicate with each other using any of a variety of communication protocols. In one implementation, each node in the network may communicate as a communication "station" using a physical (PHY) layer protocol that is used by the nodes to send transmissions to any other stations that are close enough to successfully receive the transmissions. In FIG. 1, the first device 110 includes a network interface 104 for coupling the first device 110 to the powerline communications medium 115. The first device 110 also includes a PHY controller 108 and a line cycle adaptation module 106. The PHY controller 108 operates in coordination with the line cycle adaptation module 106 to configure the physical layer transmission properties to be used by the network interface 104. Similarly the second device 120 also includes a network interface 124, PHY controller 128, and line cycle adaptation module 126 having corresponding functionality and protocols as those same units in the first device 110.

Having described the structural features of FIG. 1, various embodiments described in this disclosure may be described in relation to FIG. 1. It should be restated that the features of FIG. 1 are provided as an example and without limitation to the scope of the various described embodiments. Furthermore, some or all of the operations described may be performed independently or not at all in some implementations.

At stages A and B, a channel estimation process is used to determine the quality associated with the communications channel. In the example, the second device 120 will be considered the "transmitting" device and the first device 110 will be considered the "receiving" device. In practice, each device may operate as transmitting device and receiving device at different times during normal operation.

In an example channel estimation process, the second device 120 (as transmitting device) sends a signal that can be detected and measured by the first device 110 (as receiving device). The first device 110 analyzes the quality characteristics of the received signal to determine communications properties for each carrier at various times in the powerline cycle. For example, the PHY controller 108 may perform SNR measurements. Typically SNR is detected at a receiving device.

In a traditional system, upon completion of channel estimation processes, the receiving device (first device 110) may prepare and send physical layer transmission properties (which may also be referred to as "channel adaptation information") in the form of a tone map back to the transmitting device (second device 120). For example, the line cycle adaptation module 106 may prepare a tone map message constructed in accordance with a physical layer protocol and send the tone map message such that the line cycle adaptation module 126 of the second device 120 can interpret the tone map message. Physical layer transmission properties may include settings for modulation, transmission power, carrier usage, forward error control, guard interval spacing, frequency or time division multiplexing, etc. The first device 110 may update a tone map at any time by sending a new tone map to the second device 120.

However, in the traditional system, the tone map message is defined for one of a plurality of predefined time periods of the powerline cycle. As described in FIG. 2, this may be inefficient for some systems due to the fixed durations of the predefined time periods. In accordance with this disclosure, the durations of time periods may be variably defined as needed based on measured characteristics of the powerline cycle.

Figure 3:
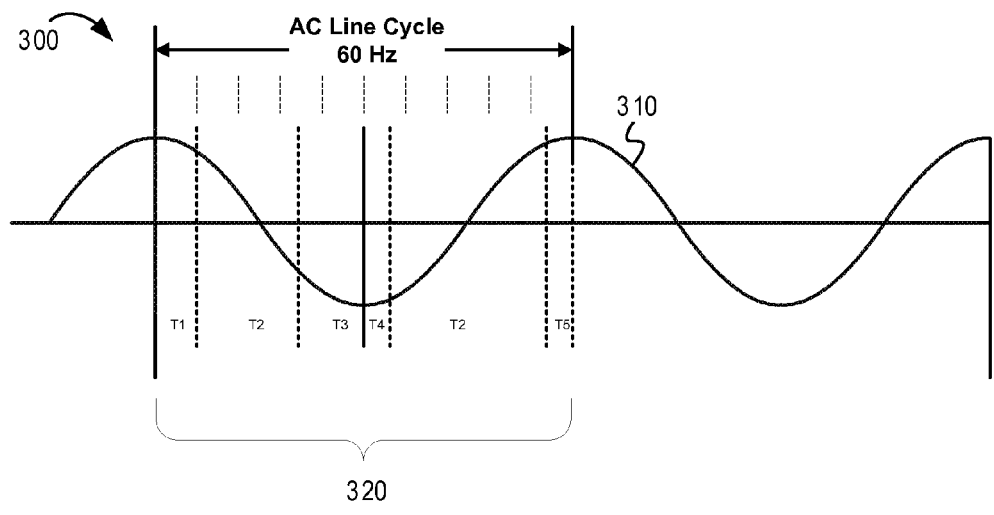
FIG. 3 is a graph showing variable line cycle adaptation periods with variable durations in accordance with various embodiments of this disclosure.

At stage C, the first device 110 determines line cycle adaptation time periods based on the SNR of the received signals. The durations of the line cycle adaptation periods may be defined with unequal durations. FIG. 3 provides an example of variable line cycle adaptation periods. Throughout this disclosure, the term "variable" may also be interpreted as "dynamically defined," "custom," or "bespoke."

At stage D, the first device 110 coordinates the line cycle adaptation periods and channel adaptation properties with the second device 120 for subsequent transmissions. As an example, an extended tone map message may be used to convey the physical layer transmission properties as well as time information for when the physical layer transmission properties should be used relative to the powerline cycle. For example, the time information may include a start time relative to a predefined transition (e.g. zero cross) of the powerline cycle and the duration for the channel adaptation period. In accordance with an embodiment of this disclosure, a tone map message may be extended or modified to include information about the determined time period for use with the tone map. Alternatively, a separate time period definition message may be sent from the receiving device to the transmitting device. The time period definition message may be sent in coordination with a set of tone maps associated with each determined time period. Other ways of coordinating the defined line cycle adaptation periods are described herein and readily conceived.

Figure 2:
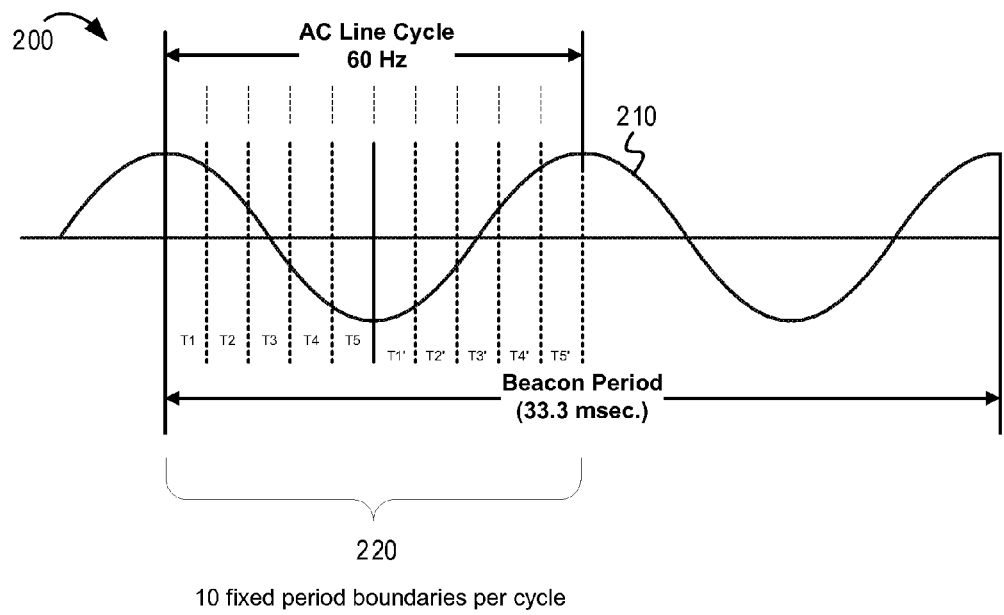
FIG. 2 is a graph showing line cycle adaptation periods with fixed durations and pre-determined boundaries.

FIG. 2 is a graph 200 showing line cycle adaptation periods with fixed durations and pre-determined boundaries as used in a traditional system. In traditional powerline communications technology, a plurality of tone maps may be used at various fixed periods throughout the line cycle 210. A device may generate multiple tone maps to be used at different fixed periods of time 220 in the time domain of the communications medium. In FIG. 2, the AC powerline cycle 210 has a powerline frequency of 60 Hz per cycle. In North America, where the AC powerline uses 60 Hz line cycle, an example of a traditional power cycle division may be made up of five equal size periods for each half cycle. In the example of the traditional power cycle division, five tone maps may be defined—one for each of the five periods. The same division and tone map assignment may be repeated in a second half cycle. Therefore, a full line cycle may be divided into ten equal size periods 220 and each period is associated with a tone map. Tone maps T1-T5 are assigned to each of five fixed periods in the first half cycle. T1'-T5' represent the same tone maps T1-T5 which are also used (repeated from the first half cycle) in the second half cycle. The same pattern would continue for subsequent cycles. It should be noted that Europe uses a 50 Hz line cycle which may be divided into 12 fixed periods. Other regions may utilize different powerline cycles.

However, at each boundary from a first period to a second period, a transmitter must change to the tone map associated with the next period. For this reason, the fixed periods create fixed boundaries at certain points in the line cycle where a first transmission ends and a new transmission begins. Therefore, the traditional approach causes fixed boundaries which interrupt transmissions due to a change in tone maps. The fixed boundaries may force a transmitter stop a current transmission at the end of a first period and start a second transmission in a second period. At the start of the second transmission, overhead signaling may be needed as part of the second transmission (such as headers or other overhead added at the beginning of the second transmission). Therefore, the fixed boundaries may cause additional overhead due to the stop and start of transmissions at the boundaries. It may be desirable to avoid the additional overhead associated with the fixed boundaries if two consecutive periods share the same channel characteristics (and same tone map). Furthermore, the fixed boundaries create a coarse inflexible division of the line cycle.

FIG. 3 is a graph 300 showing variable line cycle adaptation periods with variable durations in accordance with various embodiments of this disclosure. In one embodiment, the entire powerline cycle may be divided into variable size time periods. The figure below shows the same powerline cycle 310 as the previous figure, with the variable (i.e. custom defined) line cycle adaptation periods 320.

As shown in FIG. 3, in one embodiment, the boundaries between line cycle adaptation periods may not be limited by the previously defined coarse division of fixed time periods. For example, a period using tone map T2 and period using tone map T3 may be separated by a boundary occurring between the previous defined fixed boundaries. Furthermore, boundaries may be eliminated if channel conditions allow for continued use of a tone map for a time longer than the previously defined fixed time periods. For example, tone map T2 may be used for a longer time period without making an abrupt termination at the previous time period boundaries. Another feature is that periodic noise may be isolated with a finer precision by setting a smaller time period for part of the powerline cycle. For example, tone map T4 may be assigned for a short period based on a periodic noise occurring at the valley of the powerline cycle. In some embodiments, tone map T4 may also be associated with refraining from using that portion of the powerline cycle if the noise is such that it would prohibit reliable communication. By setting a shorter time period associated with tone map T4, a smaller fraction of the line cycle is isolated, which is shorter than would be using the coarse fixed division in the traditional approach.

As shown in FIG. 3, the flexible nature of the channel adaptation periods provides improvements to the efficiency of the powerline communications. For example, eliminating boundaries, isolating smaller fractions of powerline cycle due to noise, and the coordination of custom channel adaptation periods may provide improvements to the throughput and efficiency of the powerline communications medium. Various mechanisms for determining the variable channel adaptation periods are further described in FIGS. 4 and 7.

Figure 4:
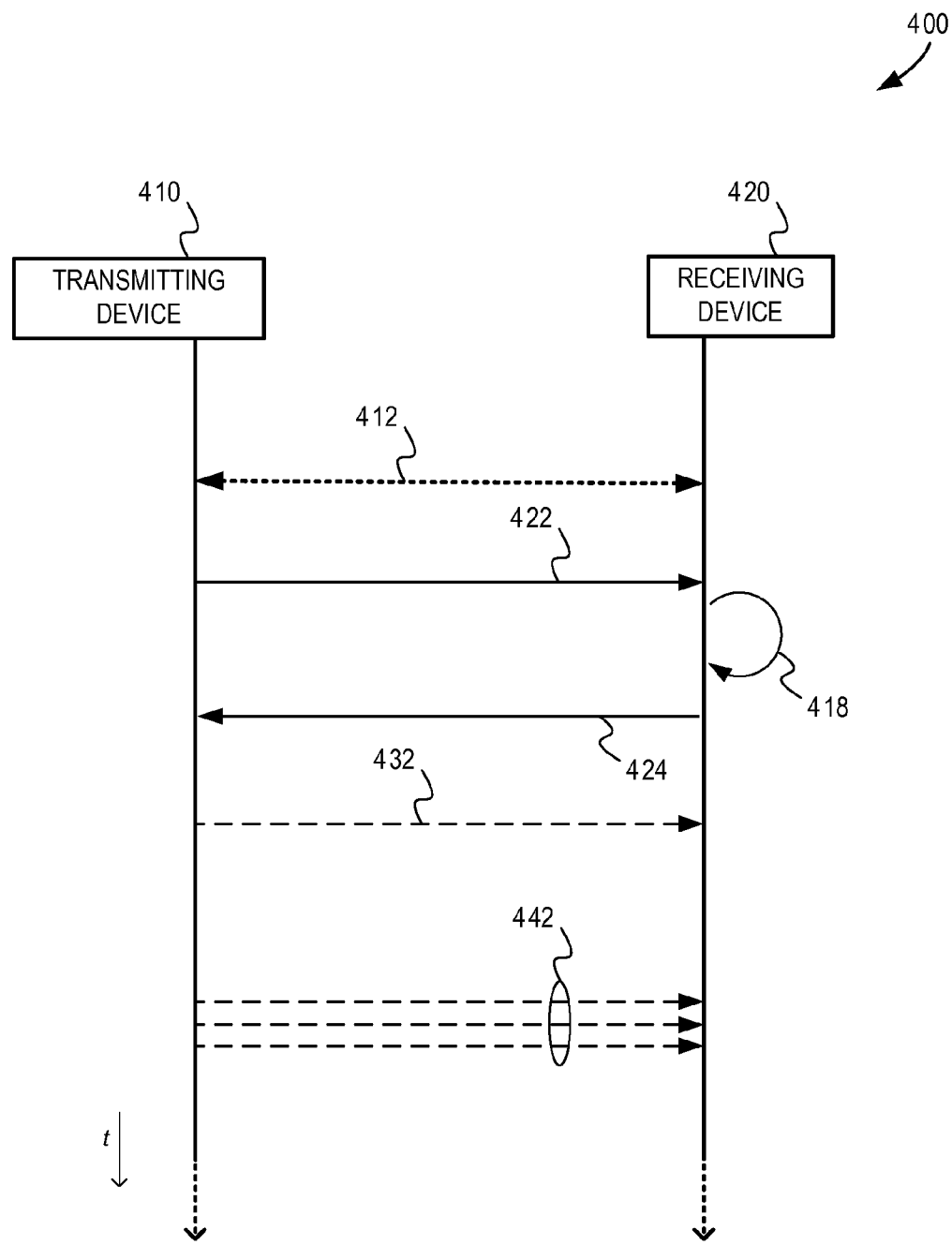
FIG. 4 is a message flow diagram depicting example operations for determining and using variable line cycle adaptation periods.

FIG. 4 is a message flow diagram 400 depicting example operations in accordance with embodiments of this disclosure. At 412, the transmitting device 410 and receiving device 420 are coupled via a powerline communications channel. At 422, the transmitting device 410 may send signals (such as training, reference, sounding, or data signals) to the receiving device 420. The receiving device 420 monitors and measures these signals to determine signal to noise ratio (SNR) associated with the signals. For example the SNR may be per-carrier and determined at various times throughout the powerline cycle. The receiving device 420 may measure the signals to determine SNR associated with the communication channel.

At 418, the receiving device 420 determines channel adaptation periods based upon the SNR characteristics of the powerline cycle. For example, the receiving device 420 may create an average SNR for a corresponding time slot based on SNR values for the time slot over a series of powerline cycles. In some embodiments, the quantity of time slots may correspond with the quantity of orthogonal frequency division multiplexing (OFDM) symbols that are received during a powerline cycle. After preparing an average SNR for each corresponding time slot, the receiving device 420 may group consecutive time slots based on average SNR values within a range to define a channel adaptation period of consecutive time slots. Similarly, if a channel adaptation period extends over a plurality of time slots, and the average SNR for different time slots covered by the channel adaptation period are more than a threshold difference, the channel adaptation period may be split into two or more channel adaptation periods. The operations may be referred to a splitting or merging channel adaptation periods.

In embodiment using splitting and merging techniques, a set of fixed time periods are initially defined. If SNR measurements for two or more adjacent time periods are within a threshold range of each other, then the boundaries between the two or more adjacent time periods may be removed. In other words, two adjacent time periods may be "merged" together if they have a similar SNR characteristic. By merging two adjacent time periods, the same tone map would be used throughout the longer merged time period, resulting in fewer transmission interruptions.

It may also be possible to "split" an existing fixed time period into two or more new shorter time periods. For example, a device may take SNR measurements on a more frequent basis rather than averaging for the entire time period. In one embodiment, SNR measurements could be taken on a per-symbol basis. If a pattern over consecutive line cycles indicate that a time period may have different SNR characteristics at different times in the time period, then the time period may be split (also referred to as divided) into smaller time periods based upon the SNR characteristics.

In some implementations, the merging and splitting of time periods for the line cycle may be based on determining patterns in the SNR measurements over a series of line cycles. Changes to the determined time periods may result in a reduction in the number of tone maps needed to support a communications channel. Furthermore, the fine control over time period boundaries provide for less interruptions of transmissions during the line cycle while isolating smaller periods of periodic noise (periodic with regard to the line cycle).

Returning to FIG. 4, at 418, the receiving device 420 may also use the SNR information to determine various parameters such as the type of modulation, code rate and guard interval to be used by the transmitting device 410 for each line cycle adaptation period. In other words, the receiving device 420 prepares tone map information that would normally be prepared except that the tone map information can be prepared in view of the variable line cycle adaptation periods.

In one embodiment, the line cycle adaptation periods and tone map information may be sent collectively as an extended tone map message (shown as arrow 424) to the transmitting device 410 in response to receiving the signal. The line cycle adaptation periods may be structured as line cycle period data. The line cycle period data may be included as part of tone map message. Alternatively, the line cycle period data may be included as a separate portion of a configuration message that includes both the tone map data and the line cycle period data. As another alternative, the line cycle period data may be sent separately as a separate configuration message.

At 432, the transmitting device 410 may send acknowledgement message to confirm that it has received the line cycle period data. Subsequent transmissions (shown as arrows 442) may utilize the transmission properties from the tone map associated with the line cycle adaptation period in which the subsequent transmissions occur.

Figures 5, 6:
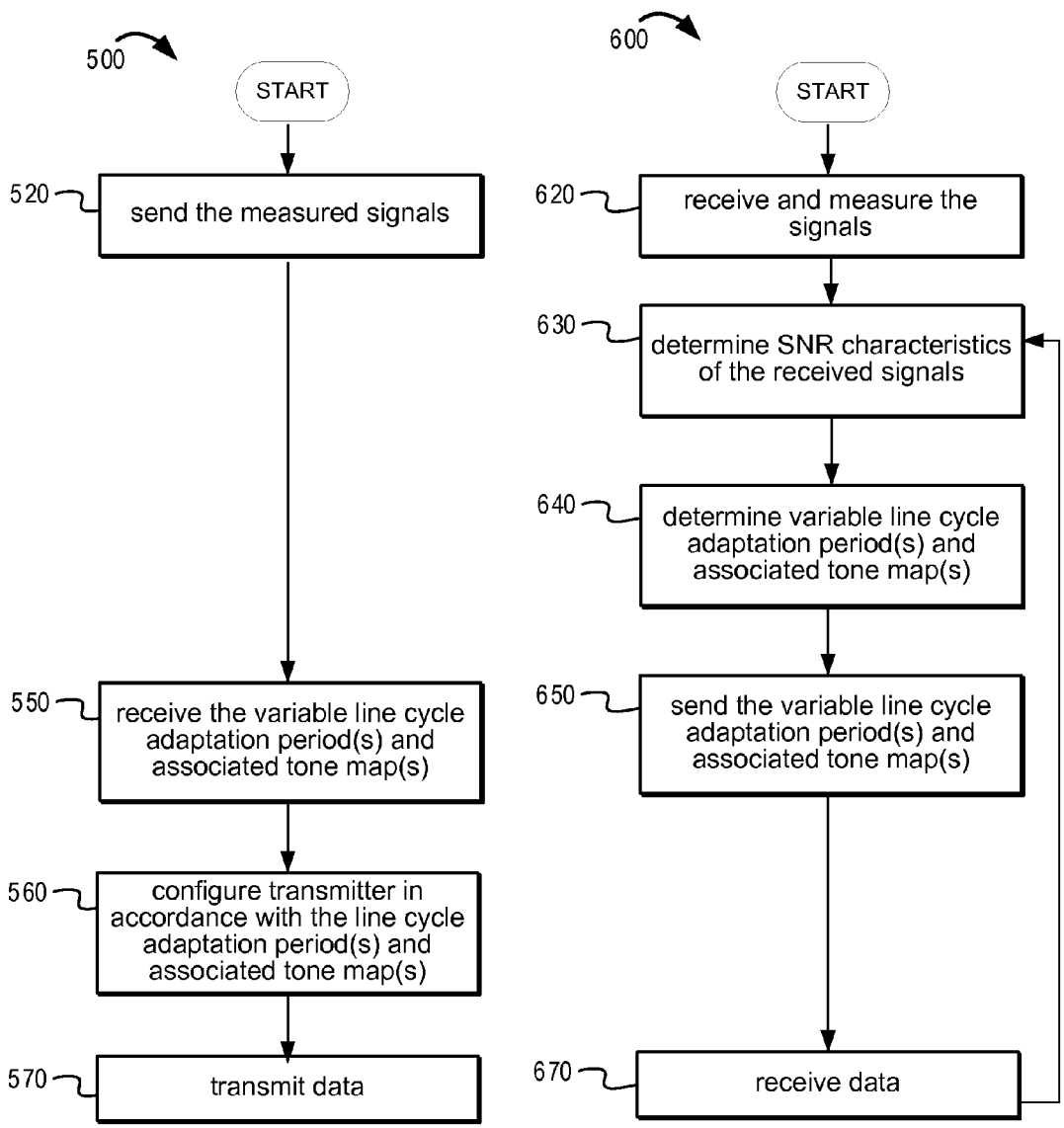
FIG. 5 is a flow diagram illustrating example operations at a transmitting device in which techniques for variable line cycle adaptation are described.
FIG. 6 is a flow diagram illustrating example operations at a receiving device in which techniques for variable line cycle adaptation are described.

FIG. 5 is a flow diagram 500 illustrating example operations at a transmitting device. At 520, the transmitting device participates in the channel estimation process by sending signals to be measured by the receiving device. The signals may comprise pilot or reference signals sent according to a physical layer protocol or may be data signals in an ongoing transmission. At 550, the transmitting device receives one or more messages from the receiving device which include configurations of variable line cycle adaptation period(s) and associated tone map(s). The tone map includes physical layer transmission properties for each of a plurality of carriers used in the communications channel during a particular line cycle adaptation period. At 560, the transmitting device configures the transmitter in accordance with the line cycle adaptation periods and associated tone map. At 570, the transmitting device transmits further messages, data, or signals using the physical layer transmission properties defined by the associated tone map during each corresponding line cycle adaptation period.

FIG. 6 is a flow diagram 600 illustrating example operations for determining line cycle adaptation periods. The operations may begin with a channel estimation process or may be ongoing during normal operation of the communication medium. At 620, an operation includes the receiving device receiving and measuring signals from a transmitting device. At 630, the receiving device may determine the SNR characteristics of the received signals. At 640, the receiving device determines the variable line cycle adaptation periods based upon the SNR measurements and prepares one or more corresponding tone maps with physical layer transmission properties.

At 650, the receiving device sends the variable line cycle adaptation periods and associated tone maps to the transmitting device. Subsequently, the receiving device receives data or other signals from the transmitting device at 670 in accordance with the variable line cycle adaptation periods and associated tone maps. In some implementations, the receiving device may repeat the operations at 630, 640, and 650 based on subsequently received signals.

The receiving device may perform the operations of flow diagram 600 separately for each transmitting device for which signals are received. Furthermore, the line cycle adaptation periods and corresponding tone maps may be specific to a particular transmitting device.

Figure 7:
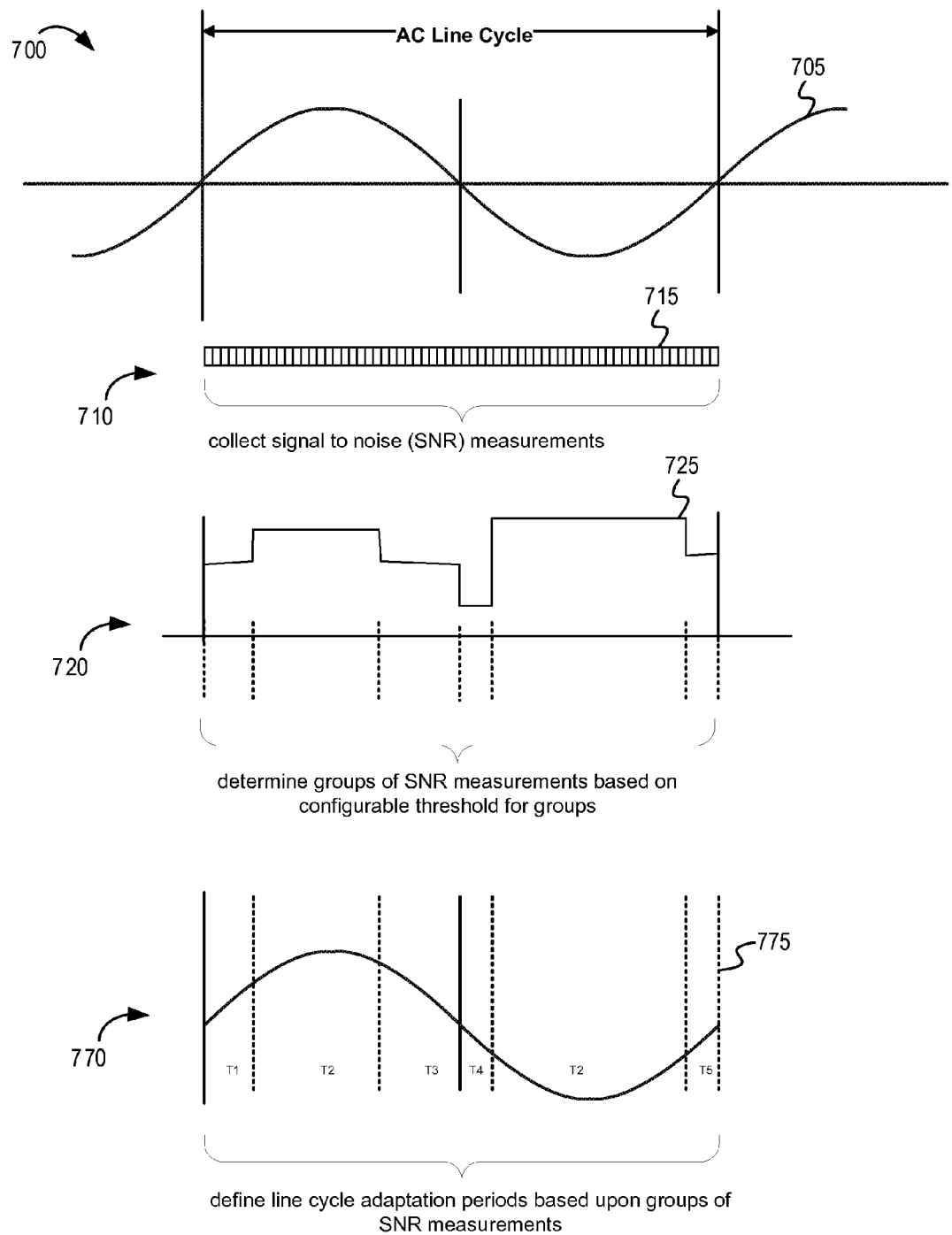
FIG. 7 is a conceptual illustration of example operations for determining variable line cycle adaptation periods in accordance with an embodiment of this disclosure.

FIG. 7 is a conceptual illustration of example operations for determining variable line cycle adaptation periods in accordance with an embodiment of this disclosure. FIG. 4 described a "merging" and "splitting" approach to defining line cycle adaptation periods. In another approach described in FIG. 7, the boundaries for each time period may be considered fully variable. The time period boundaries do not begin with an initial coarse time period boundaries. Rather, the time period boundaries defining time periods may be determined based solely on SNR measurements. The performance of this embodiment may be even higher than the performance of the previous embodiment for at least two reasons: (1) more precise alignment with channel/noise changes, and (2) the ability to define very small time periods for particular regions of the line cycle. In this embodiment, when channel and noise conditions change on the AC line cycle, the device defines time periods such that boundaries between time periods align closely to these channel conditions.

One common occurrence on the powerline is the presence of high energy impulsive noise. Impulsive noises are often so strong that no communication can take place during the time of the noise. With the variable boundaries, a device can very precisely delineate the start and stop time of the noise and avoid communication during that period of time, without losing much performance, since the duration of the noise is typically very short. Another common example in which variable boundaries may isolate portions of the line cycle includes changes in the channel attenuation caused by commonly used charging devices. Some charging devices cause a sudden change in the channel/noise characteristics. Variable boundaries may allow a system to accurately delineate line cycle adaption periods to align with the abruptly varying characteristics of the channel.

Using variable boundaries, the boundaries between line cycle adaptation periods may be dynamically defined. The resolution at which boundaries can be placed may be associated with a resolution at which channel state information is available. In one embodiment, a useful metric of channel state information for the purpose of determining channel adaptation regions is the Signal-to-Noise ratio per unit time. Since powerline communication systems often employ multicarrier communications such as OFDM, Signal-to-Noise ratio per OFDM symbol can be used for determining the boundaries for adaptation intervals.

In FIG. 7, a powerline cycle 705 is displayed as a reference graph 700. For purposes of synchronization, a beginning reference point may be selected. In the example of FIG. 7, the beginning of the powerline cycle is defined as the zero cross point from negative to positive. It should be understood that any beginning reference point may be used.

During operation of the receiver, SNR characteristics or other measurable characteristics are collected. In FIG. 7, the collection 710 of SNR measurements are shown as boxes 715 (not to scale). The quantity of SNR measurements may be predefined or configurable (for example, as memory allows). In one embodiment, the SNR measurements are taken periodically during "time slots" that are defined for the line cycle. In one example, SNR measurements are measured for each OFDM symbol (each symbol representing a time slot). Measuring SNR on a per-symbol basis provides a very fine level of granularity while also keeping the resulting channel adaptation periods appropriately sized based on OFDM symbol boundaries.

In some embodiments, the SNR may be measured for a plurality of different carriers (frequencies) used to modulate information via the powerline cycle. The SNR measurements for the plurality of carriers may be averaged to determine an overall per-symbol SNR measurement value for each time slot of the powerline cycle. For example, in one embodiment, SNR measurements for specific carriers are averaged to determine the average SNR measurement value for specific carriers. In another embodiment, an SNR measurement for a particular time slot may comprise an average of SNR measurements for a set of randomly or pseudorandomly selected carriers.

It should also be understood that an SNR measurement for a particular time slot may be averaged with corresponding SNR measurements for the particular time slot in a plurality of line cycles. For example, three or more powerline cycles may be measured and the SNR measurements in each corresponding time slot averaged to determine an average SNR for the time slot.

At 720, the collection of SNR measurements (or averages) may be analyzed to determine groups based upon configurable thresholds. Shown as 725, the SNR measurements from 710 are plotted in a conceptual graph to show the concept of SNR measurement groups. The dashed lines represent possible boundaries between groups of consecutive SNR measurements that share a common range. Often several consecutive SNR measurements may be within a predefined threshold of each other and therefore could be considered a group of SNR measurements. Areas in which one or more SNR measurements indicate low SNR (e.g. "noisy" period) may be isolated by creating a grouping of SNR measurements. The quantity of line cycle adaptation periods may be limited in some implementations. Changing the threshold tolerance associated with the SNR groupings may also be used to adjust the number of SNR groups that result.

At 770, the groups of SNR measurements are used to define line cycle adaptation periods 775. The start time for a line cycle adaptation period is related to the first time slot for the first SNR measurement in a particular group. The duration may be related to the amount of time used for all time slots of all SNR measurements in the group. It should be understood that the start time and duration may be expressed in terms of time (e.g. milliseconds or microseconds), or may be expressed as a numerical value related to the time slots. For example, in an embodiment where the powerline cycle is measured 100 times per cycle, the start of a line cycle adaptation period may be "5" (indicating starting at $5/100$ past the beginning reference point of the powerline cycle).

Boundaries between the line cycle adaptation periods do not necessarily need to synchronize with reference points from the powerline. For example, a beginning reference point may be defined to begin after a period of delay following a reference point of the powerline cycle.

After defining the line cycle adaptation periods, associated tone maps T1-T5 may be defined for each line cycle adaptation period. It should be understood that a defined tone map may be reused to reduce the amount of configuration overhead for the system. For example, in FIG. 7, tone map T2 is reused for two separate line cycle adaptation periods which both share a similarly high SNR.

Figure 8:
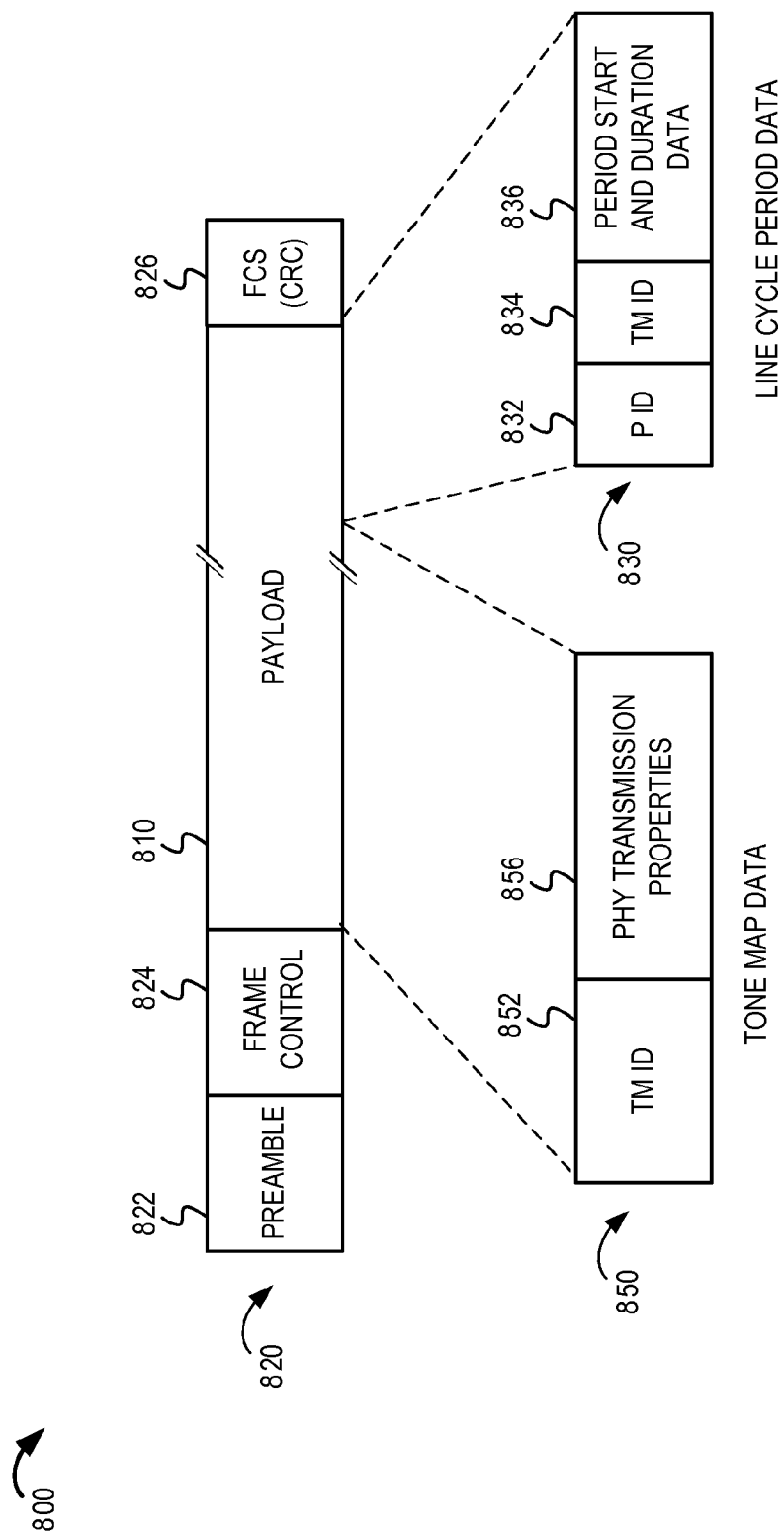
FIG. 8 is an example message format for an extended tone map message including configurations for line cycle adaptation period(s).

FIG. 8 is an example message format 800 for an extended tone map message including configurations for line cycle adaptation period(s). In some implementations, the tone map message is communicated in the form of a data unit or data packet. In some of these implementations, the data units may be transmitted over powerline using a physical layer protocol as a Physical Layer Protocol Data Unit (PPDU), such as PPDU 820. The data units or packets may include a payload part with information to be delivered to a station and may include overhead information. The payload part may include, for example, application data and/or management information, (e.g., in some cases, in the form of a packet of a higher layer protocol). In one example, the payload 810 of a PPDU 820 may comprise a "MAC Service Data Unit" (MSDU). An MSDU is a segment of information received by the MAC layer. The MAC layer can process the received MSDUs and prepares them to generate "MAC protocol data units" (MPDUs). An MPDU is a segment of information including a header (e.g., with management and overhead information) and payload fields that the MAC layer has asked the PHY layer to transport. An MPDU can have any of a variety of formats based on the type of data being transmitted. A "PHY Protocol Data Unit (PPDU)" refers to the modulated signal waveform representing an MPDU that is transmitted over the powerline by the physical layer.

The PPDU 820 may include, for example, a preamble 822 used to detect the start of the data unit, a header 824 (also called a frame control field) after the preamble and before the payload 810, and a trailing frame check sequence 826 after the payload used to check the integrity of the transmission. Payload 810 of the PPDU 820 may include tone map data 850. The tone map data may include a tone map identifier 852 to identify the tone map or to distinguish the tone map data from another collection of tone map data. The tone map data includes the physical layer transmission properties 856 (e.g., physical layer transmission properties for each of a plurality of carriers).

In an embodiment of the present disclosure, the tone map message may be extended to also include line cycle period data 830. The line cycle period data 830 may include a period identifier 832, a period tone map identifier 834 (to identify a corresponding tone map from the tone map data), and timing information 836. For example, the timing information 836 may include a starting time indicator a duration for the period in the line cycle period.

It should be understood that there may be multiple instances of the tone map data 850 in the tone map message— one for each tone map included in the message. Similarly the message may include definitions for multiple line cycle adaptation periods, in which case the structure associated with the line cycle period data 830 portion may be repeated to accommodate multiple periods. Headers, flags, or other indicators in the message could be used to identify the quantity of tone map data portions and line cycle period data portions. Alternatively, headers, flags, or other indicators could be used to indicate the beginning and/or end of the portions within the message.

Figure 9:
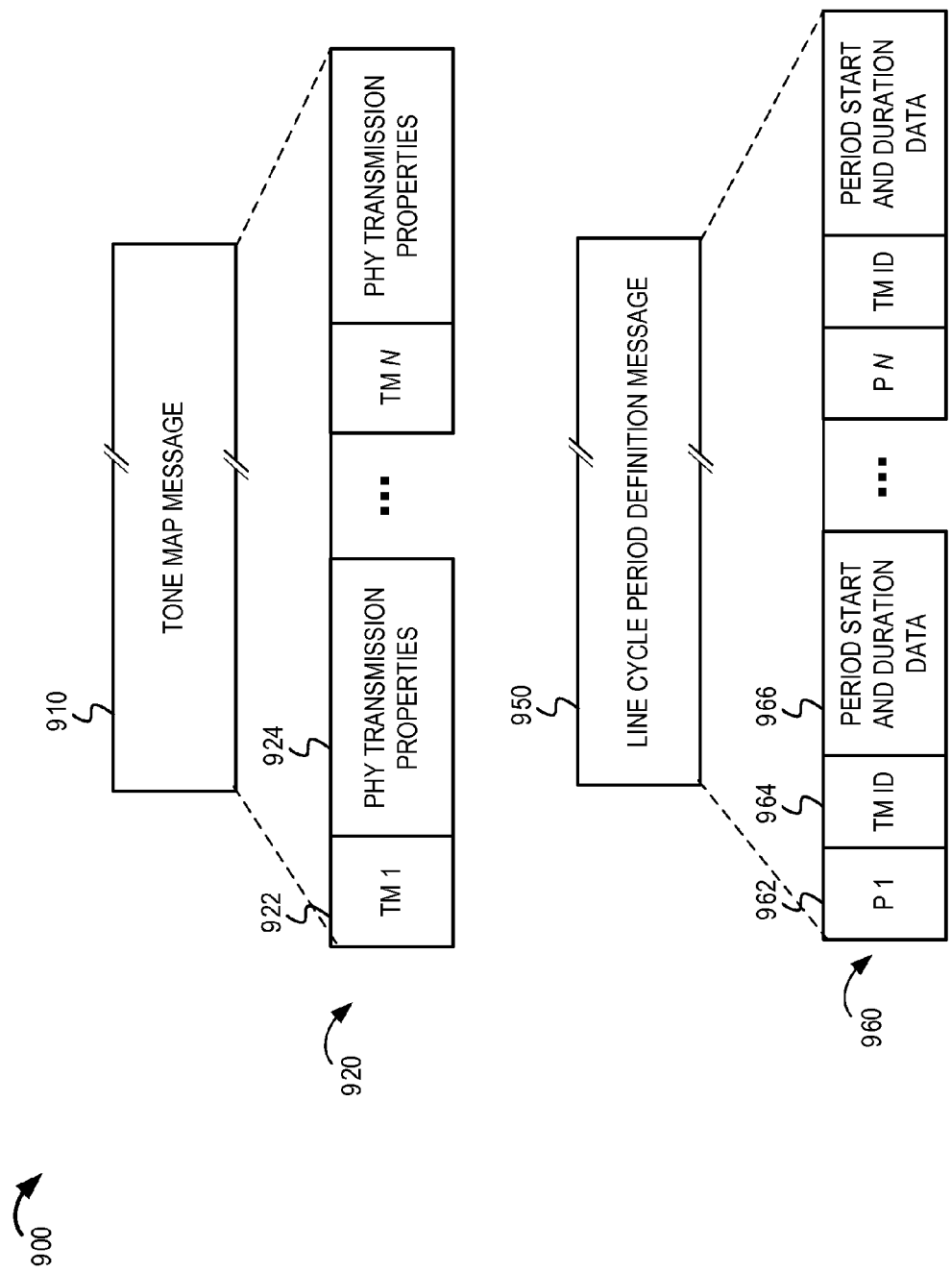
FIG. 9 is an illustration of further example messages for conveying tone map data and configurations of line cycle adaptation period(s).

FIG. 9 is an illustration 900 of separate messages used to convey tone map data and line cycle adaptation periods. A tone map message 910 may include one or more blocks of tone map data 920. Each tone map data block may include a tone map identifier 922 and physical layer transmission properties 924 associated with the tone map. A line cycle adaptation period definition message 950 may include one or more blocks of line cycle adaptation period definitions 960. Each line cycle adaptation period may be identified by a period identifier 962, an associated tone map 964 (which refers to a tone map defined in the tone map message 910), and period start and duration data 966. It should be understood that other fields may be present, including headers, checksums, delimiters, etc.

Once tone maps are defined, they may be reused for various line cycle adaptation periods. Whenever changes to either the tone maps or the line cycle adaptation periods are determined, the associated message may be sent without resending redundant or unchanged information.

Many variations to the foregoing description may be possible. For example in addition to (or alternatively from) SNR, other factors may be used when determining the time periods for the powerline cycle. For example, a device may limit the number of defined time periods based on the number of remote devices in the network or based on an available amount of memory for storing time period definitions and associated tone maps. Power levels, noise power, or other factors may also be used when determining the time periods.

It should be understood that FIGS. 1-9 and the operations described herein are examples meant to aid in understanding embodiments and should not be used to limit embodiments or limit scope of the claims. Embodiments may perform additional operations, fewer operations, operations in parallel or in a different order, and some operations differently.

As will be appreciated by one skilled in the art, aspects of the present inventive subject matter may be embodied as a system, method, or computer program product. Accordingly, aspects of the present inventive subject matter may take the form of an entirely hardware embodiment, a software embodiment (including firmware, resident software, microcode, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more non-transitory computer readable medium(s) may be utilized. Non-transitory computer-readable media comprise all computer-readable media, with the sole exception being a transitory, propagating signal. The non-transitory computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code embodied on a computer readable medium for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 10:
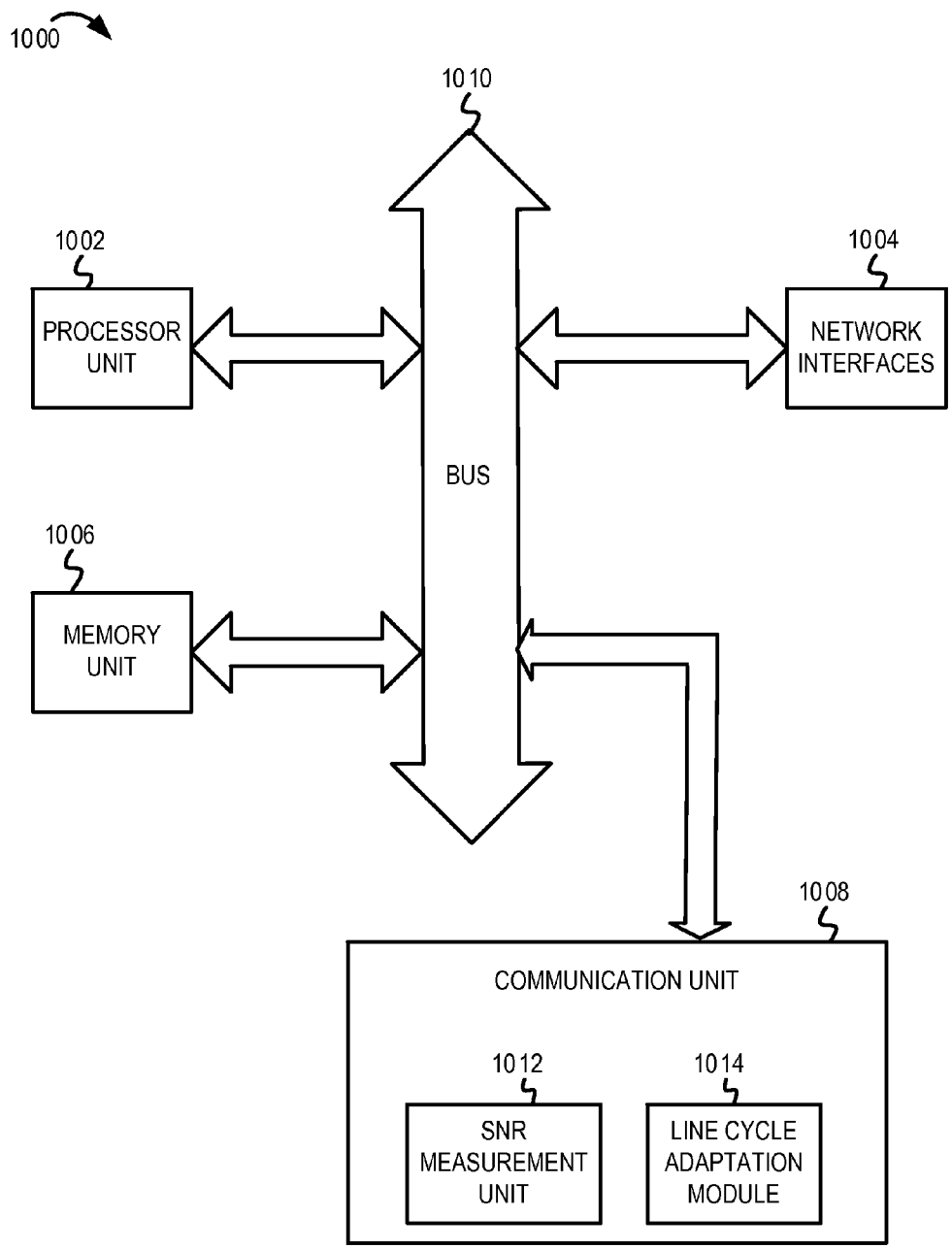
FIG. 10 is an example block diagram of one embodiment of an electronic device including a communication unit for determining or using variable line cycle adaptation periods.

FIG. 10 is an example block diagram of one embodiment of an electronic device 1000 including a communication unit for modifying a PSD shape for various transmitter power settings in accordance with various embodiments of this disclosure. In some implementations, the electronic device 1000 may be one of a laptop computer, a netbook, a mobile phone, a powerline communication device, a personal digital assistant (PDA), or other electronic systems. The electronic device 1000 includes a processor unit 1002 (possibly including multiple processors, multiple cores, multiple nodes, and/or implementing multi-threading, etc.). The electronic device 1000 includes a memory unit 1006. The memory unit 1006 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 1000 also includes a bus 1010 (e.g., PCI, ISA, PCI-Express, HyperTransport®, InfiniBand®, NuBus, AHB, AXI, etc.), and network interfaces 1004 that include at least one of a wireless network interface (e.g., a WLAN interface, a Bluetooth® interface, a WiMAX interface, a ZigBee® interface, a Wireless USB interface, etc.) and a wired network interface (e.g., an Ethernet interface, a powerline communication interface, etc.). In some implementations, the electronic device 1000 may support multiple network interfaces—each of which is configured to couple the electronic device 1000 to a different communication network.

As powerline communication gains wider acceptance, communication devices that implement other communication technologies can be configured to also support powerline communication to implement a cost-effective, single-point communication solution. For example, PLC capabilities may be incorporated into electronic systems such as set-top boxes, multimedia centers, gaming consoles, laptops, etc. In some embodiments, functionality of the PLC adapter module can be offloaded into two distinct units—a power supply processing unit and a PLC modem unit. The PLC modem unit can be integrated with other communication devices (e.g., a WLAN chipset) within an electronic system (e.g., mounted on one of the circuit boards within the electronic system). The power supply processing unit can comprise the power supply, zero cross detector, and safety coupling networks, and can be implemented external to the electronic system (e.g., in a wall module that connects to a power outlet).

The electronic device 1000 also includes a communication unit 1008. The communication unit 1008 comprises an SNR measurement unit 1012 and a line cycle adaptation module 1014. It should be understood, that in some embodiments, the communication unit 1008 may also have a dedicated processor (e.g., such as a communication unit comprising a system on a chip, or board with multiple chips, or multiple boards, in which the communication may have one or more dedicated processor or processing unit(s), in addition to the main processor 1002). As described above in FIGS. 1-9, the line cycle adaptation module 1014 implements functionality to determine variable line cycle adaptation periods. The line cycle adaptation module 1014 may also generate the line cycle adaptation periods based SNR measurements collected by the SNR measurement unit 1012. Any one of these functionalities may be partially (or entirely) implemented in hardware and/or on the processor unit 1002. For example, the functionality may be implemented with an application specific integrated circuit, in logic implemented in the processor unit 1002, in a co-processor on a peripheral device or card, etc. Further, realizations may include fewer or additional components not illustrated in FIG. 10 (e.g., video cards, audio cards, additional network interfaces, peripheral devices, etc.). The processor unit 1002, the memory unit 1006, and the network interfaces 1004 are coupled to the bus 1010. Although illustrated as being coupled to the bus 1010, the memory unit 1006 may be coupled to the processor unit 1002.

While the embodiments are described with reference to various implementations and exploitations, it will be understood that these embodiments are illustrative and that the scope of the inventive subject matter is not limited to them. In general, techniques for variable line cycle adaptation as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
   determining, at a first device, signal-to-noise (SNR) characteristics of received signals at various times during a powerline cycle, including a first SNR measurement at a first portion of the powerline cycle and a second SNR measurement at a second portion of the powerline cycle;
   determining, at the first device, line cycle adaptation periods within the powerline cycle based at least in part on the SNR characteristics, wherein determining the line cycle adaptation periods includes determining a line cycle adaptation period boundary between the first portion of the powerline cycle and the second portion of the powerline cycle when a difference between the first SNR measurement and the second SNR measurement exceeds a threshold amount, the line cycle adaptation period boundary associated with an end of a first line cycle adaptation period and a beginning of a second line cycle adaptation period; and
   coordinating the line cycle adaptation periods with a second device such that subsequent transmissions from the second device are in accordance with line cycle adaptation properties specific to each line cycle adaptation period.

2. The method of claim 1, wherein said coordinating the line cycle adaptation periods with the second device comprises transmitting a line cycle adaptation period definition message to the second device.

3. The method of claim 1, wherein said coordinating the line cycle adaptation periods with the second device comprises associating a tone map with each line cycle adaptation period, the tone map defining transmission properties to be used during each line cycle adaptation period.

4. The method of claim 1, wherein said coordinating the line cycle adaptation periods with the second device comprises transmitting an extended tone map message that defines transmission properties and timing information associated with at least one line cycle adaptation period.

5. The method of claim 1 wherein said determining the line cycle adaptation periods comprises:
initially setting a set of line cycle adaptation periods to have equal durations; and
merging two consecutive line cycle adaptation periods to create a longer line cycle adaptation period when SNR characteristics for the two consecutive line cycle adaptation periods are within the threshold amount of each other.

6. The method of claim 1, further comprising:
splitting a particular line cycle adaptation period into two or more smaller line cycle adaptation periods when SNR characteristics for portions of the particular line cycle adaptation period are not within the threshold amount of each other.

7. The method of claim 1, wherein said determining SNR characteristics comprises measuring SNR characteristics on a per-OFDM-symbol basis.

8. The method of claim 1, wherein a quantity of line cycle adaptation periods determined is based at least in part at least in part on a number of nodes in a powerline communications cell.

9. The method of claim 1, wherein the line cycle adaptation periods include at least two periods with unequal durations.

10. The method of claim 1, wherein determining the line cycle adaptation periods includes:
determining the first line cycle adaptation period based at least in part on a first plurality of consecutive SNR measurements that are within the threshold amount of each other, the first plurality of consecutive SNR measurements including the first SNR measurement; and
determining the second line cycle adaptation period based at least in part on a second plurality of consecutive SNR measurements that are within the threshold amount of each other, the second plurality of consecutive SNR measurements including the second SNR measurement.

11. The method of claim 4, wherein said timing information includes a start time relative to a predefined transition of the powerline cycle and a duration.

12. The method of claim 7, further comprising:
averaging SNR measurements for each corresponding symbol slot over a plurality of powerline cycles; and
determining a baseline pattern of SNR values for each symbol slot of the powerline cycle, wherein the line cycle adaptation periods are based at least in part on the baseline pattern of SNR values.

13. An apparatus comprising:
a processor;
a memory to store instructions, which when executed by the processor, cause the apparatus to:
determine signal-to-noise (SNR) characteristics of received signals at various times during a powerline cycle, including a first SNR measurement at a first portion of the powerline cycle and a second SNR measurement at a second portion of the powerline cycle;
determine line cycle adaptation periods within the powerline cycle based at least in part on the SNR characteristics, and to determine a line cycle adaptation period boundary between the first portion of the powerline cycle and the second portion of the powerline cycle when a difference between the first SNR measurement and the second SNR measurement exceeds a threshold amount, the line cycle adaptation period boundary associated with an end of a first line cycle adaptation period and a beginning of a second line cycle adaptation period; and
coordinate the line cycle adaptation periods with a second device such that subsequent transmissions from the second device are in accordance with line cycle adaptation properties specific to each line cycle adaptation period.

14. The apparatus of claim 13, wherein the instructions, when executed by the processor, cause the apparatus transmit a line cycle adaptation period definition message to the second device.

15. The apparatus of claim 13, wherein the instructions, when executed by the processor, cause the apparatus to associate a tone map with each line cycle adaptation period, the tone map defining transmission properties to be used during each line cycle adaptation period.

16. The apparatus of claim 13, wherein the instructions, when executed by the processor, cause the apparatus to transmit an extended tone map message that defines transmission properties and timing information associated with at least one line cycle adaptation period.

17. The apparatus of claim 13, wherein the instructions, when executed by the processor, cause the apparatus to:
initially set a set of line cycle adaptation periods to have equal durations; and
merge two consecutive line cycle adaptation periods to create a longer line cycle adaptation period when SNR characteristics for the two consecutive line cycle adaptation periods are within the threshold amount of each other.

18. The apparatus of claim 13, wherein the instructions, when executed by the processor, cause the apparatus to measure SNR characteristics on a per-OFDM-symbol basis.

19. The apparatus of claim 16, wherein said timing information includes a start time relative to a predefined transition of the powerline cycle and a duration.

20. The apparatus of claim 17, wherein the instructions, when executed by the processor, cause the apparatus to:
split a particular line cycle adaptation period into two or more smaller line cycle adaptation periods when SNR characteristics for portions of the particular line cycle adaptation period are not within the threshold amount of each other.

21. A non-transitory computer readable medium storing computer program code, the computer program code comprising instructions which when executed by a processor of a device cause the device to:
determine signal-to-noise (SNR) characteristics of received signals at various times during a powerline cycle, including a first SNR measurement at a first portion of the powerline cycle and a second SNR measurement at a second portion of the powerline cycle;
determine line cycle adaptation periods within the powerline cycle based at least in part on the SNR characteristics and to determine a line cycle adaptation period boundary between the first portion of the powerline cycle and the second portion of the powerline cycle when a difference between the first SNR measurement and the second SNR measurement exceeds a threshold amount, the line cycle adaptation period boundary associated with an end of a first line cycle adaptation period and a beginning of a second line cycle adaptation period; and coordinate the line cycle adaptation periods with a second device such that subsequent transmissions from the second device are in accordance with line cycle adaptation properties specific to each line cycle adaptation period.

22. The non-transitory computer readable medium of claim 21, wherein the instructions which when executed by the processor of the device cause the device to coordinate the line cycle adaptation periods with the second device comprises instructions which when executed by the processor of the device cause the device to:

transmit a line cycle adaptation period definition message to the second device;

associate a tone map with each line cycle adaptation period, the tone map defining transmission properties to be used during each line cycle adaptation period; or transmit an extended tone map message that defines transmission properties and timing information associated with at least one line cycle adaptation period.

23. The non-transitory computer readable medium of claim 21, further comprising instructions which when executed by the processor of the device cause the device to:

initially set a set of line cycle adaptation periods to have equal durations; and merge two consecutive line cycle adaptation periods to create a longer line cycle adaptation period when SNR characteristics for the two consecutive line cycle adaptation periods are within the threshold amount of each other, or split a particular line cycle adaptation period into two or more smaller line cycle adaptation periods when SNR characteristics for portions of the particular line cycle adaptation period are not within the threshold amount of each other.

* * * * *